(12) United States Patent
Leone et al.

(10) Patent No.: US 7,607,176 B2
(45) Date of Patent: Oct. 20, 2009

(54) TRAINABLE RULE-BASED COMPUTER FILE USAGE AUDITING SYSTEM

(75) Inventors: Cheryl A. Leone, Pompano Beach, FL (US); Michael G. Lisanke, Boynton Beach, FL (US); James C. Mahlbacher, Lake Worth, FL (US); Jose Martinez, Jr., Boca Raton, FL (US); Susan E. Waefler, Boca Raton, FL (US); George W. Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/985,989

(22) Filed: Nov. 12, 2004

(65) Prior Publication Data

US 2006/0107334 A1  May 18, 2006

(51) Int. Cl.
*G06F 7/04* (2006.01)
*G06F 17/30* (2006.01)
*G06F 11/30* (2006.01)
*G09C 1/00* (2006.01)
*G09G 5/00* (2006.01)
*G06F 13/00* (2006.01)
*H04N 7/173* (2006.01)

(52) U.S. Cl. .............................. 726/27; 713/187; 726/2
(58) Field of Classification Search .................... 726/27
See application file for complete search history.

(56) References Cited

U.S. PATENT DOCUMENTS

| 2002/0082997 A1 | 6/2002 | Kobata et al. |
| 2002/0138377 A1 | 9/2002 | Weber |
| 2002/0141584 A1 | 10/2002 | Razdan et al. |
| 2002/0186844 A1 | 12/2002 | Levy et al. |

2003/0110131 A1  6/2003  Alain et al.

(Continued)

FOREIGN PATENT DOCUMENTS

WO    WO02/086845 A1 * 10/2002

OTHER PUBLICATIONS

Aydan R. Yumerefendi, Jeffrey S. Chase, "Trust but verify: accountability for network services", Sep. 2004, EW11: Proceedings of the 11th workshop on ACM SIGOPS European workshop, pp. 1-6.*

*Primary Examiner*—Matthew B Smithers
*Assistant Examiner*—Courtney D Fields
(74) *Attorney, Agent, or Firm*—Sughrue Mion, PLLC

(57) ABSTRACT

Embodiments of the present invention provide for flexible monitoring of content. The content at a client device can be monitored based on the use and actions performed by the client. In order to monitor the content at the client, a dependency is created between any recipient of the content and a monitor installed at the client device. For example, the content may be encrypted and, when the content is accessed by a potential recipient, the recipient may be required to request a key from the monitor. This activates the monitor to begin recording transaction data and events about the content's use, such as the recipient's identity and the type of actions performed. The monitor can be configured to passively monitor and record the use of the content at the client's device. In addition, the monitor can be configured to provide audit data that indicates the transaction data recorded to a server.

40 Claims, 5 Drawing Sheets

U.S. PATENT DOCUMENTS

| | | |
|---|---|---|
| 2003/0131353 A1 | 7/2003 | Blom et al. |
| 2003/0135576 A1 | 7/2003 | Bodin |
| 2003/0182246 A1 | 9/2003 | Johnson et al. |
| 2003/0217275 A1 | 11/2003 | Bentley et al. |
| 2003/0225701 A1* | 12/2003 | Lee et al. ............... 705/57 |
| 2004/0006585 A1 | 1/2004 | Paulus et al. |
| 2004/0010602 A1 | 1/2004 | Van Vleck et al. |
| 2004/0044779 A1 | 3/2004 | Lambert |

* cited by examiner

TRAINABLE RULE-BASED COMPUTER FILE USAGE AUDITING SYSTEM

FIELD

The present invention relates to distributing content. In particular, the present invention relates to monitoring the use of content.

BACKGROUND

Today, there is significant interest in the electronic distribution of multimedia content such as, for example, documents, images, music, videos, etc. The interest in this type of media has especially grown in light of, for example, the mobility of users and their computers. Many Internet protocols allow users to download or otherwise obtain digital content from publishers that are in open and standard formats, such as hypertext markup language (HTML), portable document format (PDF), MP3, and the like.

However, the organizations that maintain and provide this content must often enforce various controls and restrictions over the content. For example, in order to comply with privacy regulations, such as the Health Insurance Portability and Accountability Act (HIPAA), it is necessary to show diligence in the protection of personal information.

Digital rights management (DRM) solutions are a well known solution for controlling content. DRM solutions generally require that the content be distributed within a persistent encryption wrapper. Conventionally, DRM solutions provide its users a secret decryption key that provides temporary access to the content for some controlled purpose, such as viewing, printing, playing, etc. The decryption key is provided as part of a license that is granted to the user. In order to obtain the license, the user must often present credentials that authenticate their identity and, in some instances, make payment arrangements for the content.

Unfortunately, conventional DRM solutions can have many disadvantages. Once content is in the possession of a client, it is very difficult to control the manner in which the content is accessed and used. As a result, conventional DRM solutions are often inflexible in their rights management policies in terms of how the client uses content. For example, most DRM solutions require proprietary clients and other software to obtain, manage and interpret the rights, temporarily decrypt the encrypted content, and view/play it within a secure environment. Therefore, by their very nature, DRM solutions can be a restrictive solution in that it may be difficult for users to freely navigate.

However, in some instances, it may be sufficient to provide solutions that monitor the use of content without the tight controls of a typical DRM system. For example, it may be desirable to allow a user to have wide discretion on the use of content at their workstation, but at the same time monitor that use without interference.

Accordingly, it may be desirable to provide methods and systems that are capable of monitoring the use of content by a client that are less intrusive or restrictive than standard DRM solutions. It may also be desirable to monitor the content for non-compliant uses and provide a way to detect and report such uses.

SUMMARY

In accordance with embodiments of the invention, content in a device can be monitored. Access to the content may depend upon an encryption key held by a monitor installed at the device. At the device, a request for access to the content is received. The encryption key is retrieved from the monitor in response to the request. Access to the content is then granted in response to the request and based on the encryption key. The monitor is also activated to record transactions related to the access of the content.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention provide for flexible monitoring of content. The content at a client device can be monitored based on the use and actions performed by the client. In order to monitor the content at the client, a dependency is created between any recipient of the content and a monitor installed at the client device. In some embodiments, this dependence can be implemented based on encryption and an encryption key. For example, the content may be encrypted and, when the content is accessed by a potential recipient, the recipient may be required to request a key from the monitor. This activates the monitor to begin recording transaction data and events regarding the content's use, such as the recipient's identity and the type of actions performed. The monitor can be configured to passively monitor and record the use of the content at the client's device. That is, the monitor does not interfere with access or use of the content. In addition, the monitor can be configured to provide audit data that indicates the transaction data recorded.

Reference will now be made in detail to exemplary embodiments of the invention, examples of which are illustrated in the accompanying drawings. Wherever possible, the same reference numbers will be used throughout the drawings to refer to the same or like parts.

Figure 1:
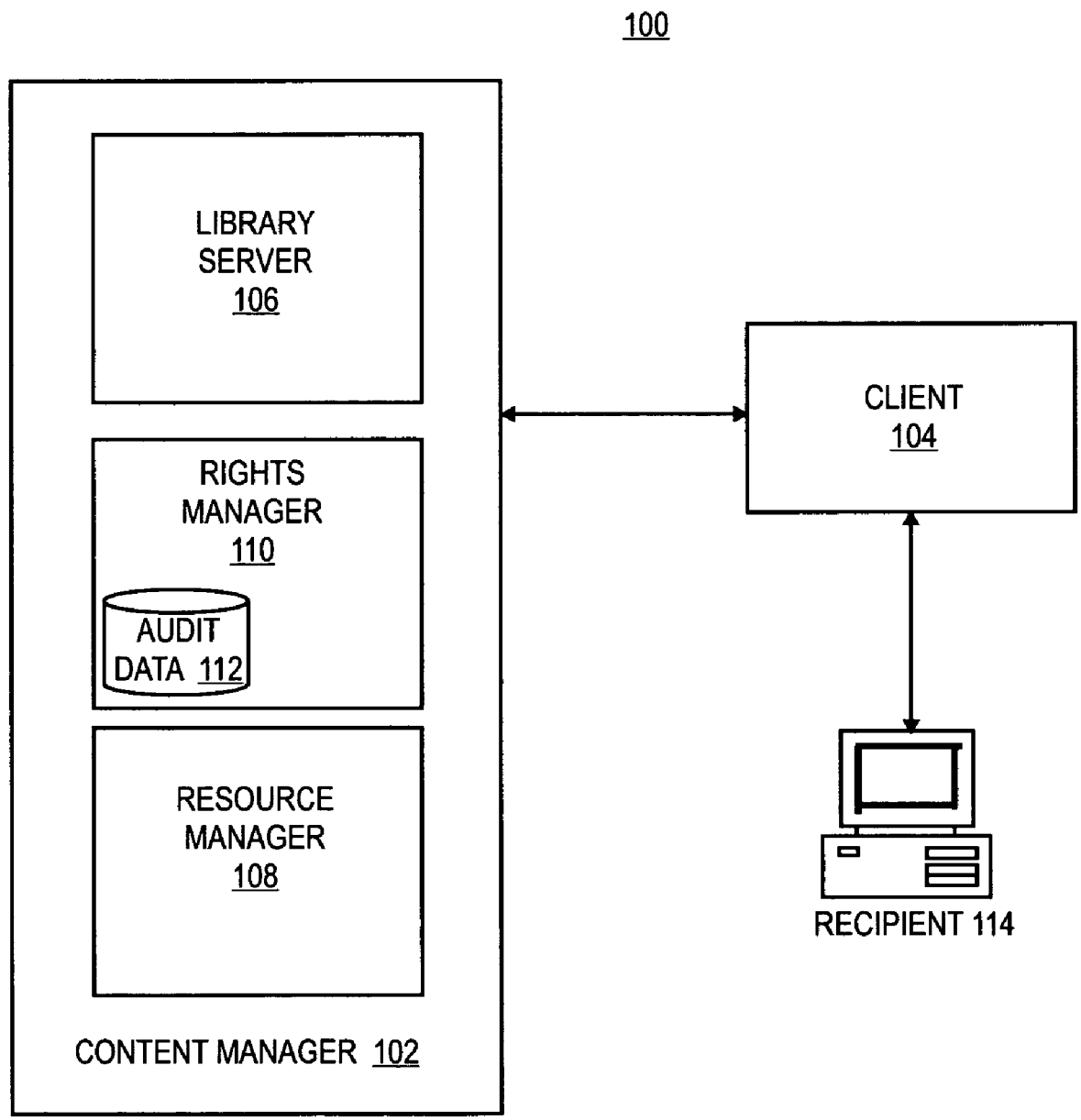
FIG. 1 illustrates an exemplary system consistent with embodiments of the present invention.

FIG. 1 illustrates a content management system 100 that is consistent with embodiments of the present invention. As shown, content management system 100 may comprise a content manager 102 and a client 104. Content manager 102 may further comprise a library server 106, a resource manager 108, and a rights manager 110 that stores audit data 112. In addition, system 100 may include a recipient 114 that is optionally coupled to client 104. These components may be coupled together using one or more networks, such as a local area network, or wide area network. In addition, these components may communicate with each other using known protocols, such as the transport control protocol and internet protocol ("TCP/IP") and hypertext transport protocol ("HTTP").

The components of content management system 100 may be implemented on separate devices or may be implemented on one or more of the same devices or systems. For example, library server 106, resource manager 104, and rights manager 110 may be installed on the same machine and run under a common operating system. Alternatively, content management system 100 may have one or more of its components implemented on multiple machines that run different operating systems.

In general, content manager 102 provides a platform and server for content providers to deliver content, such as songs, videos, documents, and the like, to users at client 104 (and recipient 114). For example, content manager 102 can be implemented as an Internet website that is accessible by client 104. As noted, content manager 102 can be implemented using well-known components to perform various functions associated with delivering content. Some of the components used in one embodiment of content manager 102 will now be described.

Library server 106 stores, manages, and provides access control to items of content stored by content manager 102. Library server 106 processes requests such as, for example, creates, reads, updates, and deletes, from client 104 and maintains the data integrity between the other components of content manager 102, such as resource manager 108. For example, library server 106 may work in conjunction with resource manager 108 to retrieve an object, such as a document or image file, that is referenced by an item of content.

Library server 106 may be implemented using a variety of devices and software. For example, library server 106 may be a computer that runs one or more application programs and stored procedures under an operating system, such as z/OS®, Windows®, AIX®, or Solaris®. In addition, library server 106 may include a database management system, such as a relational database management system, to manage stored items and perform searches for content manager 102. For example, library server 106 may use the DB2® Universal Database™ by International Business Machines Corporation (IBM®).

Resource manager 108 stores objects corresponding to items in content manager 100. Objects may be any data entity for an item content that is in digital form. For example, an object may be an audio file, an application, an image, text, or a video file. Resource manager 106 may store the objects in various formats, such as JPEG images, MP3 audio, AVI video, and ASCII text. Resource manager 108 may also store objects in formats, such as Microsoft® Word, Lotus® Word Pro®, and Wordperfect®.

Furthermore, resource manager 108 may also be configured to store multiple copies of objects on the same or a separate resource manager (not shown). Although FIG. 1 shows a single resource manager, content manager 102 may include any number of resource managers. For example, content manager 102 may include multiple resource managers that are distributed across one or more networks.

Resource manager 108 may be implemented using known devices and software. For example, resource manager 108 may be installed on one or more computers that run under the z/OS® operating system, and may include a DB2® Universal Database™, as well as a server to communicate with client 104 and library server 106, such as a HTTP server. In addition, resource manager 108 may include one or more storage devices, such as magnetic disc drives.

Rights manager 110 monitors and protects the content distributed to clients of content manager 102, such as client 104. For example, rights manager 110 may package the content using encryption and well known formats, such as Windows Media Audio, Windows Media Video formats, MP3 audio, AVI video, ASCII text, and the like.

However, unlike conventional DRM systems, in some embodiments, rights manager 110 may be configured to monitor content in a passive or non-intrusive manner. That is, rights manager 110 may allow the content to be widely used and shared by client 104 without restriction. Rights manager 110 may monitor the content by creating a dependency between client 104 and any recipient of the content, such as recipient 114. This dependency can be based on encryption, and allows rights manager 110 to monitor content to a certain extent even when that content is transferred out of client 104.

Rights manager 110 may store and maintain the audit information concerning the use of content in audit data 112. Based on audit data 112, rights manager 110 may provide various reports that track the use of content and detect non-compliant uses of such content. Content manger 102 may then be configured appropriately to stop and prevent the non-compliant uses of content.

Rights manager 110 may be implemented using known devices and software. For example, rights manager 110 may be installed on one or more computers that run under the z/OS® operating system, and may include a DB2® Universal Database™, for example, to manage and maintain audit data 112. In addition, rights manager 110 may include one or more storage devices, such as magnetic disc drives.

The embodiment of content manager 102 shown in FIG. 1 should be considered exemplary to illustrate the principles of the present invention. Of course, one skilled in the art will recognize that various other types of content servers, such as web servers and document servers, are also consistent with the principles of the present invention.

Client 104 provides a user interface for content management system 100. Client 104 may be implemented using a variety of devices and software. In some embodiments, client 104 may be required to register with content manager 102 in order to be eligible to receive content from content manager 102. As part of the registration process, client 104 may be assigned one or more user identifiers and a password for later authentication. Client 104 may be implemented on a personal computer, workstation, or terminal. In addition, client 104 may run under a Windows® operating system, or through a browser application, such as Internet Explorer™ by Microsoft® Corporation or Netscape Navigator™ by Netscape Communications® Corporation.

Although FIG. 1 shows a single client, content management system 100 may include any number of clients. For example, recipient 114 may also be used as a client device. In addition, a user may simply wish to share content and information between client 104 and recipient 114. Recipient 114 may be any computer or device that is capable of being coupled to client 104. For example, client 104 and recipient 114 may belong to coworkers in the same office network that wish to share content files. Similar to client 104, recipient 114 can be implemented using a variety of devices and software, such as a personal computer. A further description of client 104 will now be provided with reference to FIGS. 2 and 3.

Figure 2:
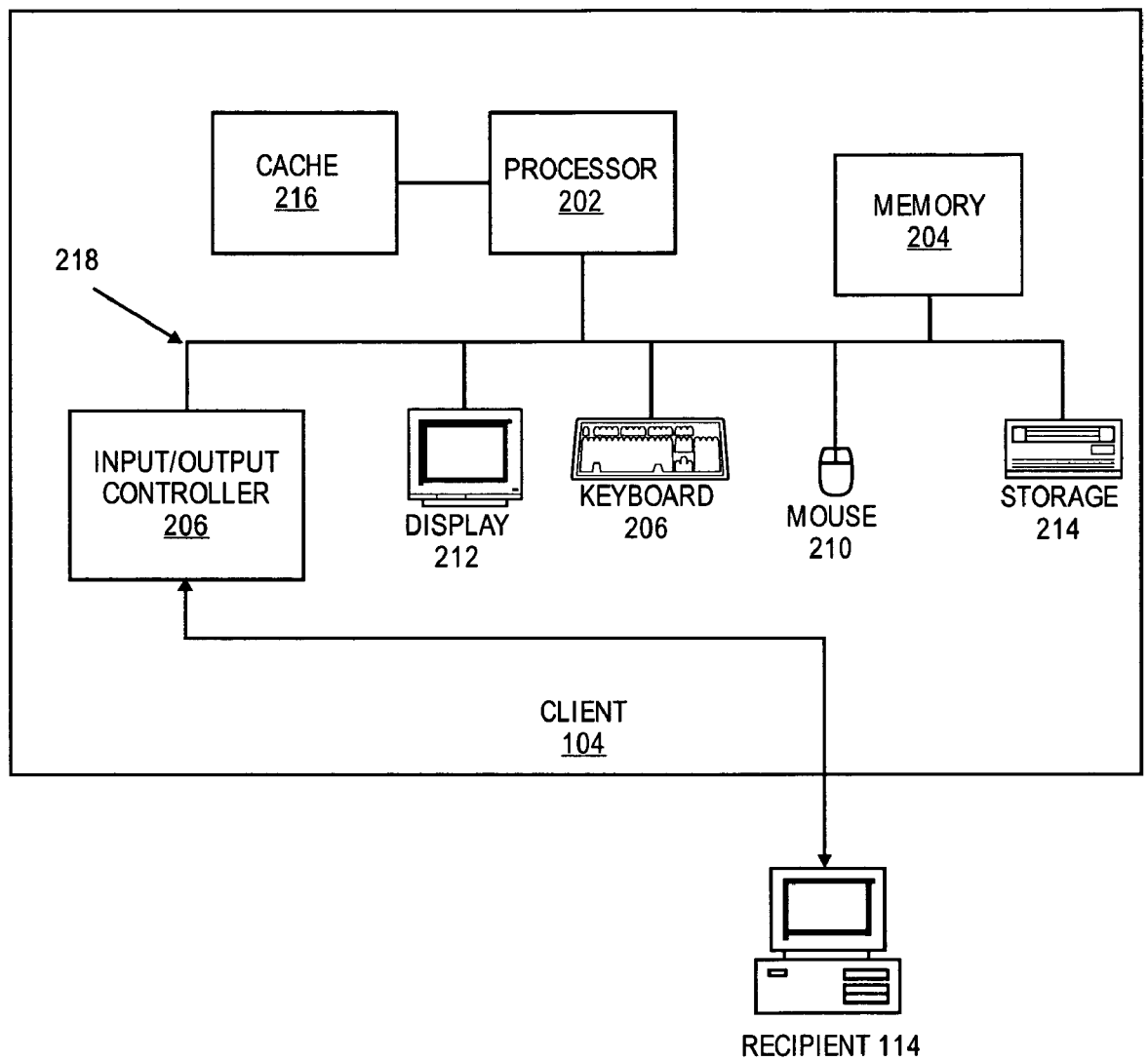
FIG. 2 illustrates an exemplary client device consistent with embodiments of the present invention.

FIG. 2 illustrates an exemplary structure for client 104 that is consistent with embodiments of the present invention. As shown, client 104 may include a central processor 202, a memory 204, an input/output controller 206, a keyboard 208, a pointing device 210 (e.g., mouse, or the like), a display 212, and a storage device 214. Processor 202 may further include a cache memory 216 for storing frequently accessed information. Cache 216 may be an "on-chip" cache or external cache. Client 104 may also be provided with additional input/output devices, such as a printer (not shown). The various components of client 104 communicate through a system bus 218 or similar architecture.

In some embodiments, processor 202 may be configured by program code, objects, data structures and the like read from or written to memory 204 and storage device 214 in order to perform various tasks or steps related to monitoring its content. For example, processor 202 may be configured to: make access to the content dependent on a key that is held by a monitor, such as a monitor application 306 (which is later described with reference to FIG. 3); receive a request for access to the content; retrieve the encryption key from the monitor in response to the request; and grant access to the content in response to the request and based on the encryption key. The monitor may then be activated by the retrieval of the encryption key to record transactions related to the access of the content for processor 202, and thus, for client 104.

Although FIG. 2 illustrates one example of the general structure for client 104 as a computer system, the principles of the present invention are applicable to other types of processors and systems. That is, the present invention may be applied to any type of processor or system used as a client device. Examples of such devices include personal computers, servers, handheld devices, and their known equivalents.

For example, recipient 114 may also be structured similarly to client 104. Accordingly, recipient 114 may also store program code, data structures, objects, and the like to configure its processor to perform various tasks or steps that enable content to be monitored by client 104. For example, recipient 114 may itself include a processor, storage, and memory that are structured in a fashion similar to processor 202, memory 204, and storage device 214 described above. The process of recipient 114 may therefore be configured to: receive a request for access to the content, such as a request to download or modify the content; retrieve the encryption key from client 104 in response to the request; access the content, for example, stored in its storage device, based on the encryption key; and send to client 104 information that indicates transactions related to the access of the content at recipient 114. Of course, other architectures and structures for performing these functions are well known to those skilled in the art.

Figure 3:
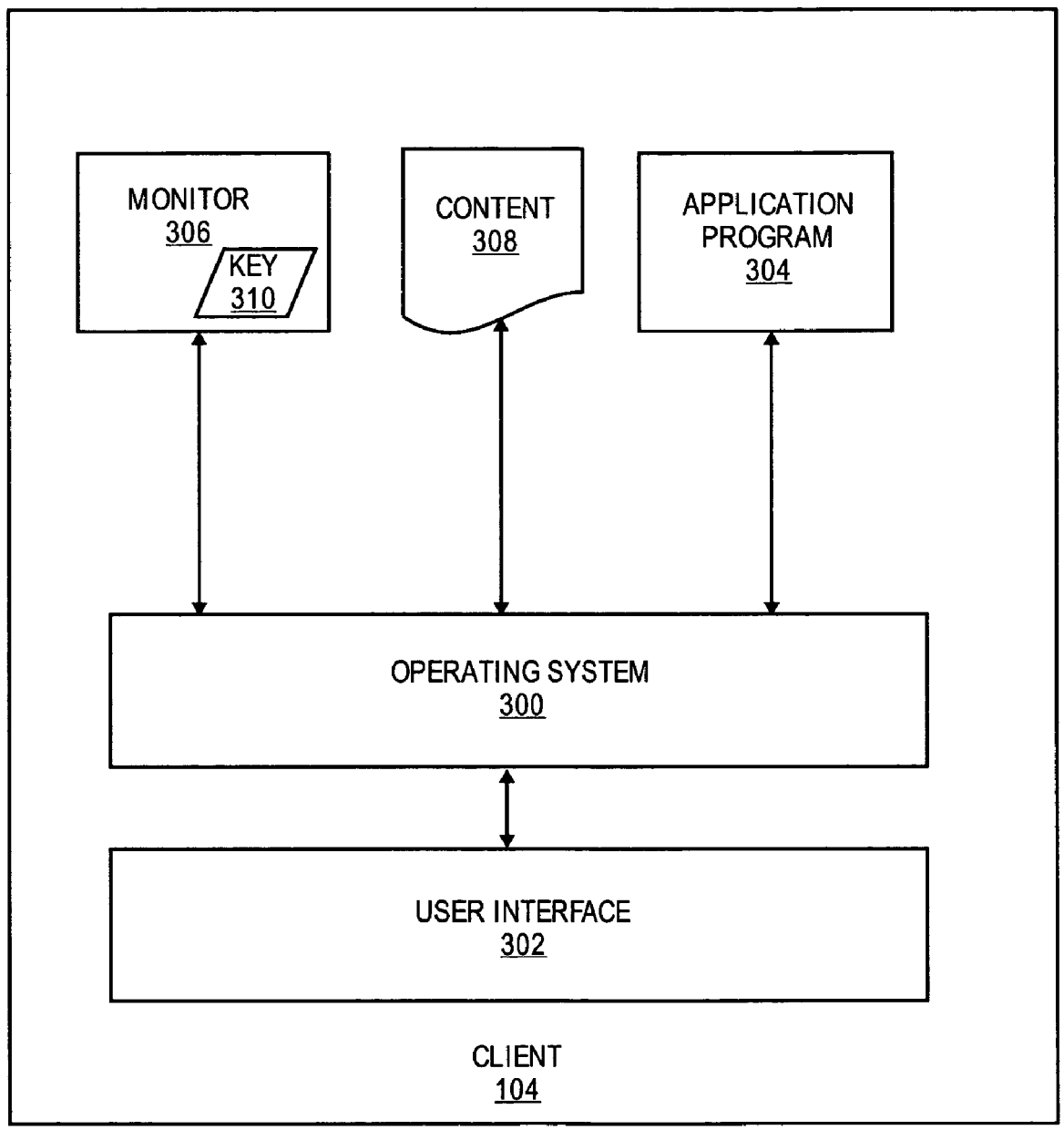
FIG. 3 illustrates an exemplary software architecture for a client device consistent with embodiments of the present invention.

FIG. 3 illustrates an example of a software architecture for client 104 that is consistent with the principles of the present invention. As shown, the software architecture of client 104 may include an operating system ("OS") 300, a user interface 302, one or more application programs 304, and a monitor 306. These components may be implemented as software, firmware, or some combination of both, which are stored in system memory 204. The software components may be written in a variety of programming languages, such as C, C++, Java, etc.

OS 300 is an integrated collection of routines that service the sequencing and processing of programs and applications by client 104. OS 300 may provide many services for client 104, such as resource allocation, scheduling, input/output control, and data management. OS 300 may be predominantly software, but may also comprise partial or complete hardware implementations and firmware. Well-known examples of operating systems that are consistent with the principles of the present invention include Mac OS by Apple Computer, Open VMS, GNU/Linux, AIX by IBM, Java and Sun Solaris by Sun Microsystems, Windows by Microsoft Corporation, Microsoft Windows CE, Windows NT, Windows 2000, and Windows XP.

Interface 302 provides a user interface for controlling the operation of client 104. Interface 302 may comprise an environment or program that displays, or facilitates the display, of on-screen options, usually in the form of icons and menus in response to user commands. Options provided by interface 302 may be selected by the user through the operation of hardware, such as mouse 210 and keyboard 208. These interfaces, such as the Windows Operating System, are well known in the art.

Additional application programs, such as application software 304, may be "loaded" (i.e., transferred from storage 214 into cache 216 or memory 204) for execution by client 104. For example, application software 306 may comprise application, such as a word processor, spreadsheet, or database management system. Well known applications that may be used in accordance with the principles of the present invention include database management programs, such as DB2 by IBM, font and printing software, and other programming languages.

Monitor 306 monitors the use of content, such as content 308, by client 104. Monitor 306 may use known techniques to monitor preexisting programs, such as application program 304, through dynamic instrumentation and a static control file. This static control file teaches monitor 306 how to detect actions attempted by application program 304 on content 308.

In some embodiments, monitor 306 is configured to audit and monitor the use of content 308 in a passive or non-interfering fashion. For example, unlike convention DRM systems, in some embodiments, monitor 306 does not interfere with whether or not to grant access to content 308. Indeed, monitor 306 can be configured to unconditionally allow content 308 to be transferred off client 104, for example, to recipient 114. In this instance, monitor 306 may watermark content 308 such that any subsequent detection of non-compliance can be tracked back to the initiating event. At that point, all necessary information can be provided to client 104 to restore compliance based on data values encoded and stored by monitor 306.

For example, monitor 306 may insert a pattern of bits or other data for a watermark to identify various characteristics about content 308, such as the author, a date of creation, a date that content 308 was last modified, a location associated with content 308, etc. For other types of content, monitor 306 may insert watermarks that are subtle or otherwise hidden, such as invisible marks in an image or video file, or in the case of audio clips, inaudible. Monitor 306 may distribute portions of the watermark throughout content 308 in such a way that the watermark is not readily identified or manipulated. Monitor 306 may also configure the watermark to withstand normal changes experienced by content 308, such as compression algorithms. Monitor 306 may include various program code, data structures, etc. that allow it to extract watermark data from content 308. Of course, any watermark that is included in content 308 may be extracted by other applications or devices, such as library server 106. One skilled in the art will recognize that monitor 306 may use any form of watermarking, data embedding, or information hiding.

In some embodiments, monitor 306 may use a watermark to assist in auditing the access of the content. In particular, monitor 306 may use a watermark to identify the source, author, creator, owner, and distributor or authorized consumer of the content. For example, OS 300 of client 104 may be configured with certain print drivers to make the watermark visible when printing a hardcopy version of the content. In the event that a user at client 104 attempts to override these print drivers, monitor 306 may detect this action by the user and record one or more transactions. These transactions may then be reported back to content manager 102. Upon this detection by monitor 306, enforcement of a policy to the content may then be carried out by other mechanisms that are well known to those skilled in the art.

In some embodiments, monitor 306 creates a dependence between any recipients, such as recipient 114, of content 308. A dependence may be any information or data that is used for access to the content. This information or data may be in the form of a data structure, program code, object, or the like. For example, this dependence can be based on encrypting content 308 and the need for encryption key 310. As noted, content 308 may be encrypted by content manager 102 when it is provided to client 104. In addition, content manager 102 may provide encryption key 310 to monitor 306. In some embodiments, monitor 306 may be required to provide authentication information, such as a user identifier and password, to rights manager 110 of content manager 102 in order to obtain encryption key 310.

Since encryption key 310 is required to decrypt content 308, any recipient is dependent on monitor 306. Hence, whenever content 308 is accessed, monitor 306 is activated by the retrieval of key 310. Once activated, monitor 306 records transactions and data related to the access of the content 308. Of course, the processing related to the dependence with monitor 306 may be accomplished in a manner that is transparent to client 104 and recipient 114.

Monitor 306 may be implemented as a separate module that is coupled to OS 300 or application software 304 via an application program interface. Monitor 306 may be installed on client 104 based on program code provided by content manager 102. Alternatively, collation engine 204 may be implemented as a component of OS 300 or application software 304. In some embodiments, monitor 306 may be implemented as software written in a known programming language, such as C, C++, or Java.

Figure 4:
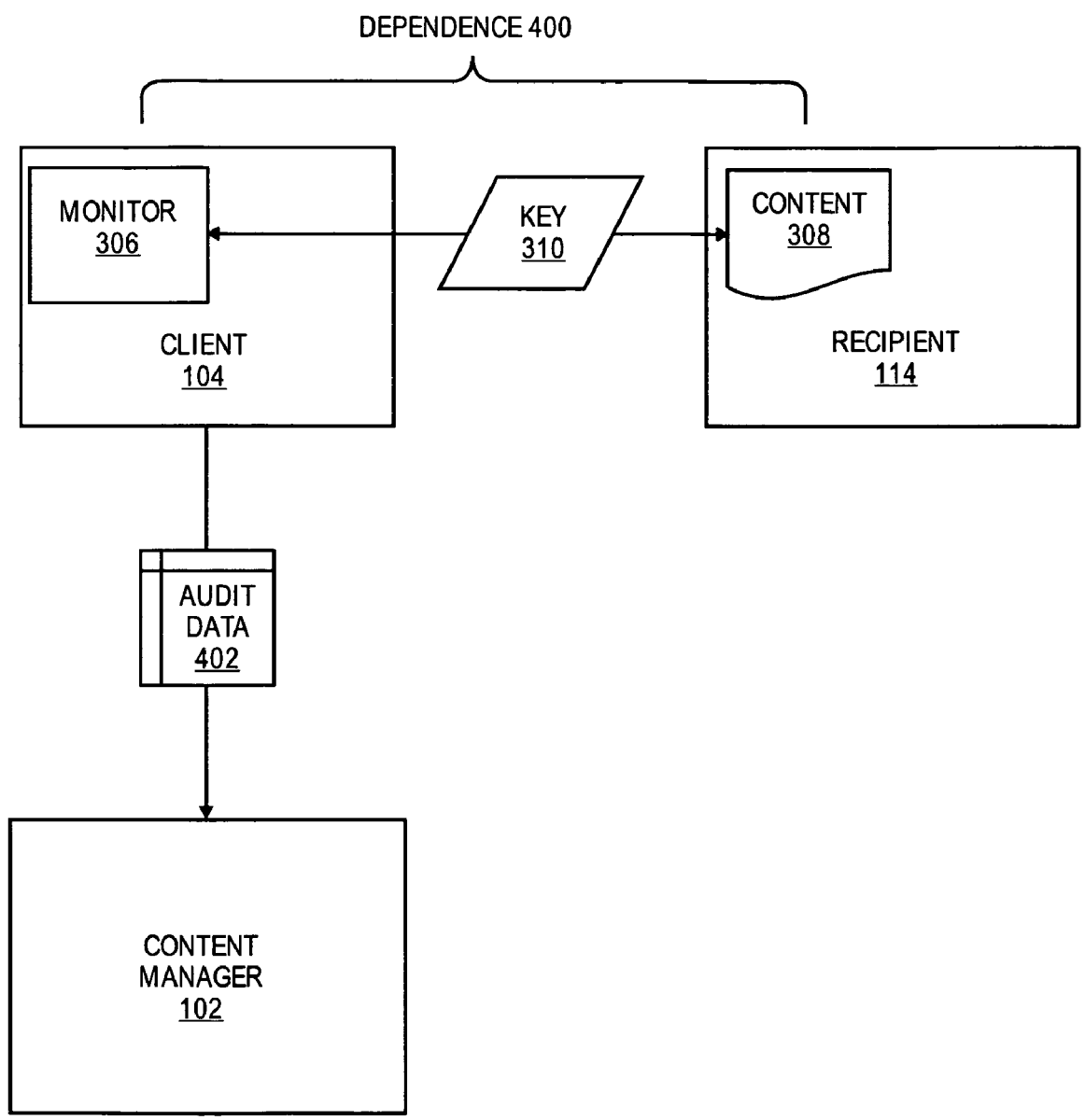
FIG. 4 illustrates an exemplary data flow for the system of FIG. 1 consistent with the principles of the present invention.

FIG. 4 illustrates an exemplary data flow for system 100 of FIG. 1 that is consistent with the principles of the present invention. In particular, FIG. 4 illustrates how client 104 can passively monitor the use of content 308 (even after it has been transferred to recipient 114) and provide audit data back to content manager 102. As shown, client 104 has permitted content 308 to be downloaded or transferred to recipient 114. However, in accordance with the principles of the present invention, a dependence 400 remains between content 308 and monitor 306 of client 104. This dependence can be implemented in a variety of ways. In the example shown in FIG. 4, dependence 400 is based on encryption of content 308 and requires the use of encryption key 310 to fully access content 308. Accordingly, when recipient 114 accesses content 308, a request is sent back to monitor 306 for encryption key 310. This processing may occur in a transparent and automatic fashion such that it does not significantly interfere with the access of content 308 by recipient 114.

In response to this request, monitor 306 transmits key 310 to recipient 114. In some embodiments, monitor 306 is configured as a passive monitor, and thus, does not restrict or limit the access by recipient 114. In addition, monitor 306 becomes activated and begins recording transaction data related to the access by recipient 114. As noted, monitor 306 may learn how to monitor the access of content 308 based on a static control file.

Monitor 306 may then provide an audit data 402 back to a server, such as content manger 102. Monitor 306 may provide audit data 402 at various times, such as periodically or in response to various events, such as the detection of a non-compliant use of content 308.

Of course, one skilled in the art will recognize that other data flows and forms of dependency between monitor 306 and content 308 are consistent with the principles of the invention. One example of a process flow will now be described with reference to FIG. 5.

Figure 5:
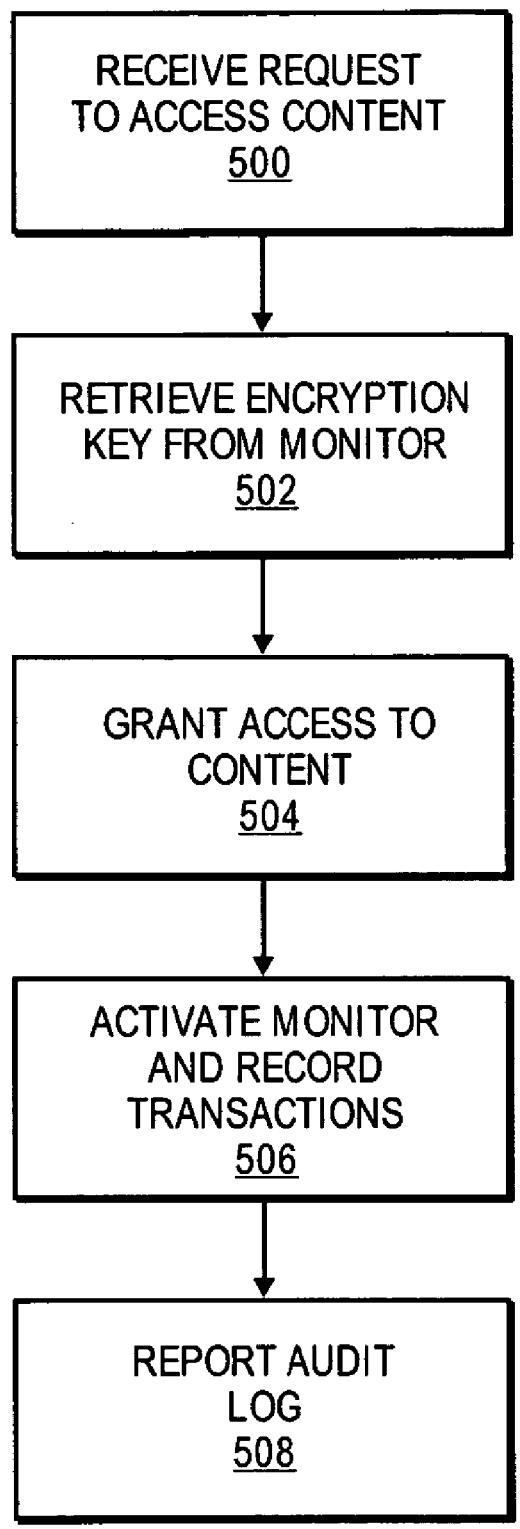
FIG. 5 illustrates an exemplary process flow for monitoring content consistent with embodiments of the present invention.

In particular, FIG. 5 illustrates an exemplary process flow for monitoring content that is consistent with embodiments of the present invention. In stage 500, client 104 receives a request to access content, such as content 308. In some embodiments, content manager 102 retrieves the content in encrypted form, for example, from resource manager 108. Alternatively, content manager 102 may encrypt the content when it is retrieved from resource manager 108. In this example, it is assumed that client 104 has been properly configured such that monitor 306 has been installed and client 104 has been authenticated by content manager 102. Of course, one skilled in the art will recognize that a user can be prompted to correctly configure client 104 in the event of a deficiency in its configuration.

The request may come from an application that is resident on client 104, such as application program 304, or any other computer, such as recipient 114. The request may be based on well known protocols and software procedures. Processing then flows to stage 502.

In stage 502, client 104 operates in conjunction with monitor 306 to retrieve encryption key 310 for content 308. Monitor 306 may have previously received encryption key 310 from rights manager 110 at various times. For example, monitor 306 may receive encryption key 310 when client 104 is registering with content manager 102. Of course, monitor 306 may receive a new encryption key each time a new item of content is requested by client 104 and at various time intervals. For example, upon receiving the request, OS 300 may interface with monitor 306 to request encryption key 310. In response, monitor 306 may then retrieve encryption key 310, for example, from memory 204 or storage 214 and provide it to OS 300. OS 300 may then provide or use encryption key 310 to the entity requesting access to content 308. Processing then flows to stage 504.

In stage 504, client 104 grants access to content 308. In some embodiments, monitor 306 is configure to be a passive monitor, and thus, allows client 104 to grant unconditional access to content 308. Accordingly, this allows virtually any action to be performed on content 308. These actions may include, but are not limited to, modifying, deleting, copying, etc. Processing then flows to stage 506.

In stage 506, client 104 activates monitor 306. In particular, monitor 306 may become activated in response to the request or transmission of key 310. Monitor 306 may then begin monitoring transactions related to the access of content 308. For example, monitor 306 may record information, such as an identifier for the recipient of content 308 and a description of the actions performed. As noted, monitor 306 may use a static control file that teaches client 104, through a list of instructions, how to detect actions attempted against content 308. In some embodiments, monitor 306 can be configured to be a passive monitor. As a passive monitor, monitor 306 may monitor the behavior associated with content 308, but does not interfere with this behavior. Monitor 306 may then record the transactions and information into memory 204 or storage 214. Processing then flows to stage 508.

In stage 508, monitor 306 reports the transactions and auditing information that it has recorded to a server, such as content manager 102. For example, monitor 306 may open a TCP/IP communication channel with content manager 102 and send one or packets that contain the auditing information. Of course, monitor 306 can use any of the well known audit or data reporting protocols. Monitor 306 may provide the auditing data to content manager 102 at various times, such as periodically, or in response to an event, such as when a non-compliant use of content 308 has been detected.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of monitoring content at a device, wherein access to the content is dependent on an encryption key that is held by a monitor installed at the device, said method comprising:
   receiving, at the device, a request for access to the content;
   retrieving the encryption key from the monitor in response to the request;
   granting access to the content in response to the request and based on the encryption key; and
   activating the monitor to begin recording transactions related to the access of the content.

2. The method of claim 1, wherein receiving the request for access to the content comprises receiving a request to download the content to an additional device.

3. The method of claim 2, wherein granting access to the content comprises permitting the device to transfer the content to the additional device.

4. The method of claim 3, further comprising:
   receiving, at the additional processor, another request for access to the content stored at the additional processor;
   retrieving the encryption key from the monitor in response to the another request; and
   activating the monitor to begin recording transactions related to access of the content at the additional processor.

5. The method of claim 1, further comprising registering the device with a server that encrypted the content.

6. The method of claim 5, further comprising transmitting at least some of the recorded transactions to the server.

7. The method of claim 5, wherein registering the device with the server that encrypted the content comprises:
   exchanging a set of keys between the server and the device, wherein at least one of the keys decrypts the content.

8. The method of claim 1, wherein activating the monitor to begin recording transactions related to the access of the content comprises inserting a watermark into the content.

9. A method of monitoring content provided to a first device, wherein access to the content is dependent on an encryption key that is held by a second device, said method comprising:
   receiving, at the first device, a request for access to the content;
   retrieving the encryption key from the second device in response to the request;
   accessing the content based on the encryption key; and
   sending to the second device information that indicates transactions related to the access of the content at the first device,
   wherein the second device records the information that indicates the transactions related to the access of the content at the first device.

10. The method of claim 9, wherein receiving the request for access to the content comprises receiving a request to download the content from the second device.

11. The method of claim 10, wherein accessing the content comprises receiving unconditional rights to access the content at the first device.

12. The method of claim 9, wherein sending to the second device information that indicates transactions related to the access of the content at the first device comprises passively monitoring the content at the first device.

13. The method according to claim 1, wherein the monitor records information about the transaction related to the access of the content.

14. The method according to claim 1, wherein the monitor records information regarding the use of the content; and
   wherein the information regarding the use of the content comprises type of actions performed on the content.

15. The method according to claim 1, wherein the monitor is a passive monitor, and
   wherein the monitor does not interfere with the behavior associated with the content.

16. The method according to claim 1, further comprising:
   auditing the transactions recorded by the monitor to detect non-compliant use of the content.

17. The method according to claim 1, wherein the monitors records the transactions based on a control static file.

18. The method according to claim 9, further comprising:
   auditing the transactions information related to the access of the content to detect non-compliant use of the content.

19. A system that is configured to monitor its content, wherein access to the content is dependent on an encryption key that is held by a monitor installed at the system, said system comprising:
   means for receiving a request for access to the content;
   means for retrieving the encryption key from the monitor in response to the request;
   means for granting access to the content in response to the request and based on the encryption key; and
   means for activating the monitor to begin recording transactions related to the access of the content.

20. The system of claim 19, wherein the system further comprises an additional device and the means for receiving the request for access to the content comprises means for receiving a request to download the content to the additional device.

21. The system of claim 20, further comprising:
   means for receiving, at the additional processor, another request for access to the content stored at the additional processor;
   means for retrieving the encryption key from the monitor in response to the another request; and
   means for activating the monitor to begin recording transactions related to access of the content at the additional processor.

22. The system of claim 19, further comprising means for registering the system with a server that encrypted the content.

23. The system of claim 22, further comprising means for transmitting at least some of the recorded transactions to the server.

24. A computer configured to monitor its content, wherein access to the content depends on a key that is held by a monitor that is installed at the computer, said computer comprising:

a memory that stores the content;

a processor configured by program code to receive a request for access to the content, retrieve the encryption key from the monitor in response to the request, and grants access to the content in response to the request and based on the encryption key; and a monitor installed on the computer that is activated by the retrieval of the encryption key to begin to begin recording transactions related to the access of the content.

25. The computer of claim 24, wherein the processor is configured to receive a request for access to the content by an additional computer and permits the content to be downloaded to the additional computer.

26. The computer of claim 25, wherein the monitor detects transactions performed on the content stored on the additional computer based on the additional computer requesting the key from the monitor.

27. The computer of claim 24, wherein the monitor transmits data indicating at least some of the transactions to a server.

28. The computer of claim 24, wherein the monitor is configured to insert a watermark into the content.

29. The computer of claim 24, wherein the monitor is configured to receive the encryption key based on registering with a server.

30. The computer of claim 24, wherein the content stored in the memory was encrypted by the server.

31. A computer readable recording medium having stored thereon program codes that configure a device to monitor its content, wherein access to the content depends on an encryption key held by a monitor installed at the device, which when executed enables a processor to perform a method comprising:

receiving, at the device, a request for access to the content;

retrieving the encryption key from the monitor in response to the request;

granting access to the content in response to the request and based on the encryption key; and activating the monitor to begin recording transactions related to the access of the content.

32. The computer readable recording medium of claim 31, further comprising:

detecting when an additional device has requested access to the content based on a request for the encryption key held by the monitor; and activating the monitor to begin recording transactions related to access of the content at the additional device.

33. A system that enables content to be monitored by a first apparatus, wherein access to the content is dependent on an encryption key that is held by a second apparatus, said first apparatus comprising:

means for receiving, at the first apparatus, a request for access to the content;

means for retrieving the encryption key from the second apparatus in response to the request;

means for accessing the content based on the encryption key; and means for sending to the second apparatus information that indicates transactions related to the access of the content at the first apparatus; and said second apparatus comprising:

means for recording the information that indicates the transactions related to the access of the content at the first apparatus.

34. The first apparatus of claim 33, wherein the means for receiving the request for access to the content comprises means for receiving a request to download the content from the second apparatus.

35. The first apparatus of claim 34, wherein the means for accessing the content comprises means for receiving unconditional rights to access the content at the first device.

36. The first apparatus of claim 35, wherein the means for sending to the second apparatus information that indicates transactions related to the access of the content at the first device comprises means for passively monitoring the content at the first device.

37. A computer readable recording medium having stored thereon program codes that configure a first device to monitor its content, wherein access to the content depends on an encryption key held by a second device, which when executed, enables a processor to perform a method comprising:

receiving, at the first device, a request for access to the content;

retrieving the encryption key from the second device in response to the request;

accessing the content based on the encryption key; and sending to the second device information that indicates transactions related to the access of the content at the first device, wherein the second device records the information that indicates the transactions related to the access of the content at the first device.

38. The computer readable recording medium of claim 37, wherein the receiving the request for access to the content comprises receiving a request to download the content from the second device.

39. The computer readable recording medium of claim 38, wherein the accessing the content comprises receiving unconditional rights to access the content at the first device.

40. The computer readable recording medium of claim 37, wherein sending to the second device information that indicates transactions related to the access of the content at the first device comprises passively monitoring the content at the first device.

* * * * *

UNITED STATES PATENT AND TRADEMARK OFFICE
CERTIFICATE OF CORRECTION

PATENT NO.      : 7,607,176 B2              Page 1 of 1
APPLICATION NO. : 10/985989
DATED           : October 20, 2009
INVENTOR(S)     : Leone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twelfth Day of October, 2010

David J. Kappos
*Director of the United States Patent and Trademark Office*